(12) United States Patent  
Choi

(10) Patent No.: US 8,368,637 B2
(45) Date of Patent: *Feb. 5, 2013

(54) LIQUID CRYSTAL DISPLAY AND DRIVING METHOD OF THEREOF

(75) Inventor: Jintaek Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 579 days.

This patent is subject to a terminal disclaimer.

(21) Appl. No.: 12/627,533

(22) Filed: Nov. 30, 2009

(65) Prior Publication Data

US 2010/0253696 A1 Oct. 7, 2010

(30) Foreign Application Priority Data

Apr. 1, 2009 (KR) .................. 10-2009-0028162

(51) Int. Cl.
*G09G 3/36* (2006.01)

(52) U.S. Cl. .......... 345/102; 345/589; 349/65; 362/603; 362/97.2

(58) Field of Classification Search ............ 349/61–69; 362/29–629, 97.1–97.3; 345/102
See application file for complete search history.

(56) References Cited

U.S. PATENT DOCUMENTS

| | | | | |
|---|---|---|---|---|
| 5,961,198 A | * | 10/1999 | Hira et al. | 362/621 |
| 7,018,087 B2 | * | 3/2006 | Yoo | 362/615 |
| 7,286,193 B2 | * | 10/2007 | Yoo et al. | 349/62 |
| 8,092,068 B2 | * | 1/2012 | Parker et al. | 362/620 |

(Continued)

FOREIGN PATENT DOCUMENTS

| | | | |
|---|---|---|---|
| GB | 2410116 A | * | 7/2005 |
| JP | 2008-51905 A | | 3/2008 |
| JP | 2008-139569 A | | 6/2008 |
| WO | 2008/022149 A2 | | 2/2008 |

OTHER PUBLICATIONS

Japanese Office Action dated Sep. 20, 2011, with English translation.

(Continued)

*Primary Examiner* — Alexander Eisen
*Assistant Examiner* — Sanjiv D Patel
(74) *Attorney, Agent, or Firm* — Morgan, Lewis & Bockius LLP

(57) ABSTRACT

A liquid crystal display and a method of driving the same capable of improving contrast properties by implementing a local dimming method and achieving the slimness of the liquid crystal display are provided. The liquid crystal display includes a liquid crystal display panel which displays a picture; a backlight unit including a light guide plate part in which first light guide channels of a first direction and second light guide channels of a second direction intersected with the first direction are formed, first light array for illuminating light to the first light guide channels, and second light array for illuminating light to the second light guide channels, respectively, wherein blocks are defined by the intersection of the first light guide channels and second light guide channels; and a dimming controller for analyzing an input picture to correspond to the blocks to obtain first dimming values for independently controlling luminances of light sources of the first light array, determining second dimming values for independently controlling luminances of light sources of the second light array based on the first dimming values, and adjusting the first and second dimming values so that a luminance difference between neighboring blocks caused by the first and second dimming values is decreased.

9 Claims, 17 Drawing Sheets

U.S. PATENT DOCUMENTS

| | | | |
|---|---|---|---|
| 2003/0043567 A1* | 3/2003 | Hoelen et al. | 362/31 |
| 2006/0002675 A1* | 1/2006 | Choi et al. | 385/129 |
| 2008/0129680 A1* | 6/2008 | Kimura et al. | 345/102 |
| 2008/0284713 A1* | 11/2008 | Hong | 345/102 |
| 2009/0015755 A1* | 1/2009 | Bang et al. | 349/65 |
| 2009/0058792 A1 | 3/2009 | Park et al. | |
| 2009/0267890 A1* | 10/2009 | Park et al. | 345/102 |
| 2009/0267926 A1* | 10/2009 | Seo et al. | 345/204 |
| 2010/0253615 A1* | 10/2010 | Han et al. | 345/102 |

OTHER PUBLICATIONS

Oh, Won-Sik, et al., *A Novel Adaptive Dimming Technique with X-Y Channels for LED Backlight System of LCD TVs*, Oct. 22-26, 2007, The 7th International Conference on Power Electronics, pp. 710-713.

Oh, Won-Sik, et al., *A Novel Two-Dimensional Adaptive Dimming Technique with X-Y Channel Drivers for LED Backlight System of LCD TVs*, Journal of Display Technology, vol. 5, No. 1, Jan. 2009, pp. 20-26.

* cited by examiner

| A | B | C | D | E | F |
|---|---|---|---|---|---|
| G | H | I | J | K | L |
| M | N | O | P | Q | R |
| S | T | U | V | W | X |

| maximum luminance value for each line of horizontal blocks (ML1) | luminance of light source |
|---|---|
| 154 ~ 255 | 1% ~ 100% |
| 0 ~ 153 | off |

| A' | B' | C' | D' | E' | F' |
|----|----|----|----|----|----|
| G' | H' | I' | J' | K' | L' |
| M' | N' | O' | P' | Q' | R' |
| S' | T' | U' | V' | W' | X' |

| maximum luminance value for each line of vertical blocks (ML2) | luminance of light source |
|---|---|
| 0 ~ 153 | off ~ 100% |

| reference dimming value | neighboing dimming value |
|---|---|
| 255 | 204 |
| ⋮ | ⋮ |
| 204 | 153 |
| ⋮ | ⋮ |
| 102 | 51 |
| ⋮ | ⋮ |
| 51 | 0 |
| ⋮ | ⋮ |
| 0 | 0 |

| 0 | 0 | 0 | 60 | 0 | 0 |
|---|---|---|---|---|---|
| 0 | 0 | 0 | 60 | 0 | 0 |
| 40 | 40 | 40 | 100 | 40 | 40 |
| 0 | 0 | 0 | 60 | 0 | 0 |

| 50 | 60 | 70 | 80 | 70 | 60 |
|---|---|---|---|---|---|
| 60 | 70 | 80 | 90 | 80 | 70 |
| 70 | 80 | 90 | 100 | 90 | 80 |
| 60 | 70 | 80 | 90 | 80 | 70 |

LIQUID CRYSTAL DISPLAY AND DRIVING METHOD OF THEREOF

This application claims the benefit of Korea Patent Application No. 10-2009-0028162 filed on Apr. 1, 2009, which is incorporated herein by reference for all purposes as if fully set forth herein.

BACKGROUND OF THE INVENTION

1. Field of the Invention

Exemplary embodiments of the invention relate to a liquid crystal display and a method of driving the same capable of implementing a local dimming.

2. Discussion of the Related Art

A liquid crystal display has an increasing application range because of light-weight, thin, low-power consumption features. The liquid crystal display has been used for portable computers such as laptop computers, office automation apparatuses, audio/video devices, and indoor/outdoor advertisement displays. A transmissive type liquid crystal display which occupies all most liquid crystal display devices displays a desired picture by controlling an electrical field applied to liquid crystal layer to modulate light incident from a backlight unit. The backlight unit is mainly classified into a direct type and an edge type.

Picture quality of the liquid crystal display depends on contrast property. The method improving the picture quality by modulating light incident from the backlight unit has a limitation. In order to improve the contrast property, a backlight dimming control method which adjusts luminance of the backlight unit according to the picture has been variously attempted. The backlight dimming control method may reduce power consumption by adaptably adjusting the luminance of the backlight unit depending on an input picture. The backlight dimming control method includes a global dimming method entirely adjusting luminance of a display screen and a local dimming method locally adjusting luminance of the display screen. The global dimming method may improve dynamic contrast measured between a previous frame and a next frame but it is difficult to improve static contrast. On the other hand, the local dimming method may improve static contrast by locally controlling luminance of the display screen in one frame period.

The direct type backlight unit has a construction in which a plurality of optical sheets and a diffusion plate are disposed under the liquid crystal display panel and a plurality of light sources are disposed under the diffusion plate. Even though the direct type backlight unit implements the local dimming method because the plurality of light sources are disposed under the diffusion plate and can be independently controlled, it is difficult to reduce a thickness thereof. Accordingly, it causes a problem to make a slim design of the liquid crystal display difficult. The reason why the direct type backlight unit can not be made to a slim construction is a space which is necessarily formed between the light sources and the diffusion plate. The diffusion plate diffuses light incident from the light sources to make luminance of the display screen uniformly. In order to sufficiently diffuse light incident from the light sources, the space between the light sources and the diffusion plate should be sufficiently guaranteed. According to the trend requiring the slim liquid crystal display, the space between the light sources and the diffusion plate is narrowed in gradual, but it makes bright lines on the display screen to lower a luminance evenness of the display screen because the light sources are observed on the display screen when the light from the light sources can not be sufficiently diffused.

The edge type backlight unit has a construction in which a light source is arranged to face a side surface of a light guide plate and a plurality of optical sheets are disposed between a liquid crystal display panel and the light guide plate. The edge type backlight unit may be implemented to have a structure thinner than the direct type backlight unit. However, it is impossible to apply the local dimming method to the edge type backlight unit because the light source illustrates light to one side of the light guide plate and the light guide plate serves to convert spot light or line light into surface light. If the local dimming method is applied to the edge type backlight unit, a distortion is observed on the display screen because light and shade are generated on an undesired area of the display screen by going-straight property of light. Furthermore, it causes another problem to decrease an entire luminance of the display screen because the evenness of the surface luminance at different areas of the light guide plate are different according to distances between positons in the light guide plate and the light source.

SUMMARY OF THE INVENTION

Exemplary embodiments of the invention provide a liquid crystal display and a method of driving the same capable of improving contrast properties by implementing a local dimming method and achieving the slimness of the liquid crystal display. It is also possible to effectively compensate the distortion of the display picture and the decrease of luminance generated when the local dimming is implemented. In one aspect, a liquid crystal display includes a liquid crystal display panel which displays a picture; a backlight unit including a light guide plate part in which first light guide channels of a first direction and second light guide channels of a second direction intersected with the first direction are formed, first light array for illuminating light to the first light guide channels, and second light array for illuminating light to the second light guide channels, respectively, wherein blocks are defined by the intersection of the first light guide channels and second light guide channels; and a dimming controller for analyzing an input picture to correspond to the blocks to obtain first dimming values for independently controlling luminances of light sources of the first light array, determining second dimming values for independently controlling luminances of light sources of the second light array based on the first dimming values, and adjusting the first and second dimming values so that a luminance difference between neighboring blocks caused by the first and second dimming values is decreased.

In another aspect, a method of driving a liquid crystal display having a liquid crystal display panel on which a picture is displayed, the method comprises: (a) defining the liquid crystal display panel into blocks having a matrix type to correspond to a light guide plate part in which first light guide channels of a first direction and second light guide channels of a second direction intersected with the first direction are formed, first light sources for illuminating light to at least one ends of the first light guide channels, and second light sources for illuminating light to at least one ends of the second light guide channels of the light guide plate part; and (b) analyzing an input picture to correspond to the blocks to obtain first dimming values for independently controlling luminance of the first light sources, obtaining second dimming values for independently controlling luminance of the second light sources based on the first dimming values, and adjusting the first and second dimming values so that a luminance difference between neighboring blocks caused by the first and second dimming values is decreased.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Hereinafter, exemplary embodiments of the invention will be described in detail with reference to the accompanying drawings so that this disclosure is thorough and complete and fully conveys the concept of the invention to those skilled in the art. This invention may, however, be embodied in many different forms and should not be construed as being limited to the embodiments set forth herein.

Figure 1:
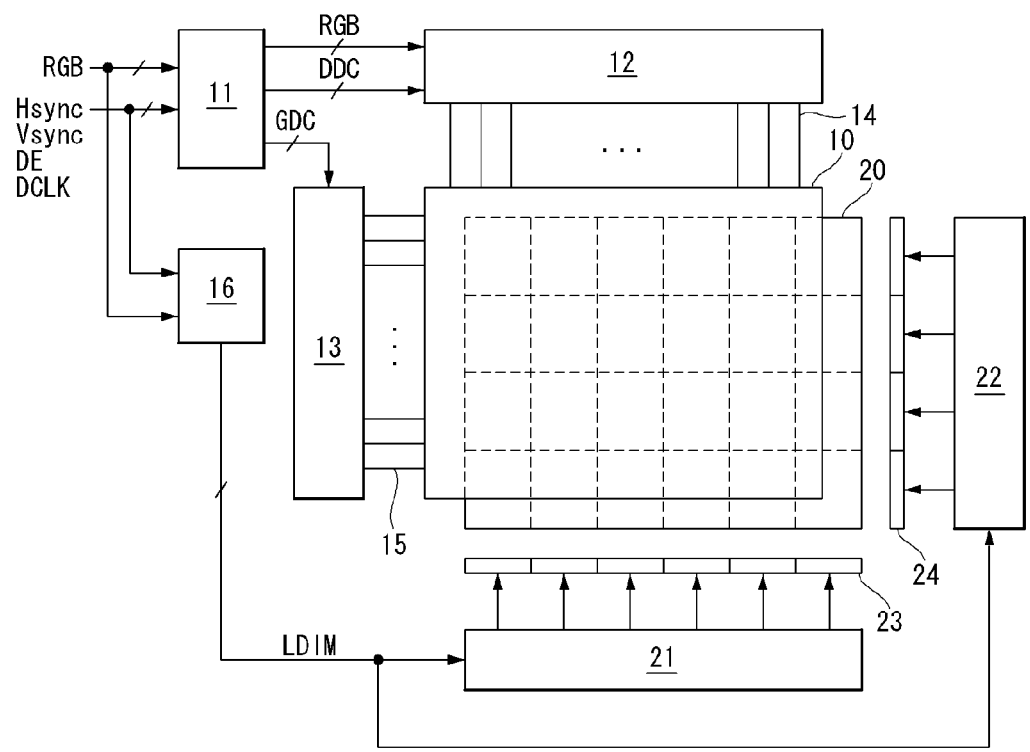
FIG. 1 is a block diagram showing a liquid crystal display according to a first exemplary embodiment of the invention.
Figure 2:
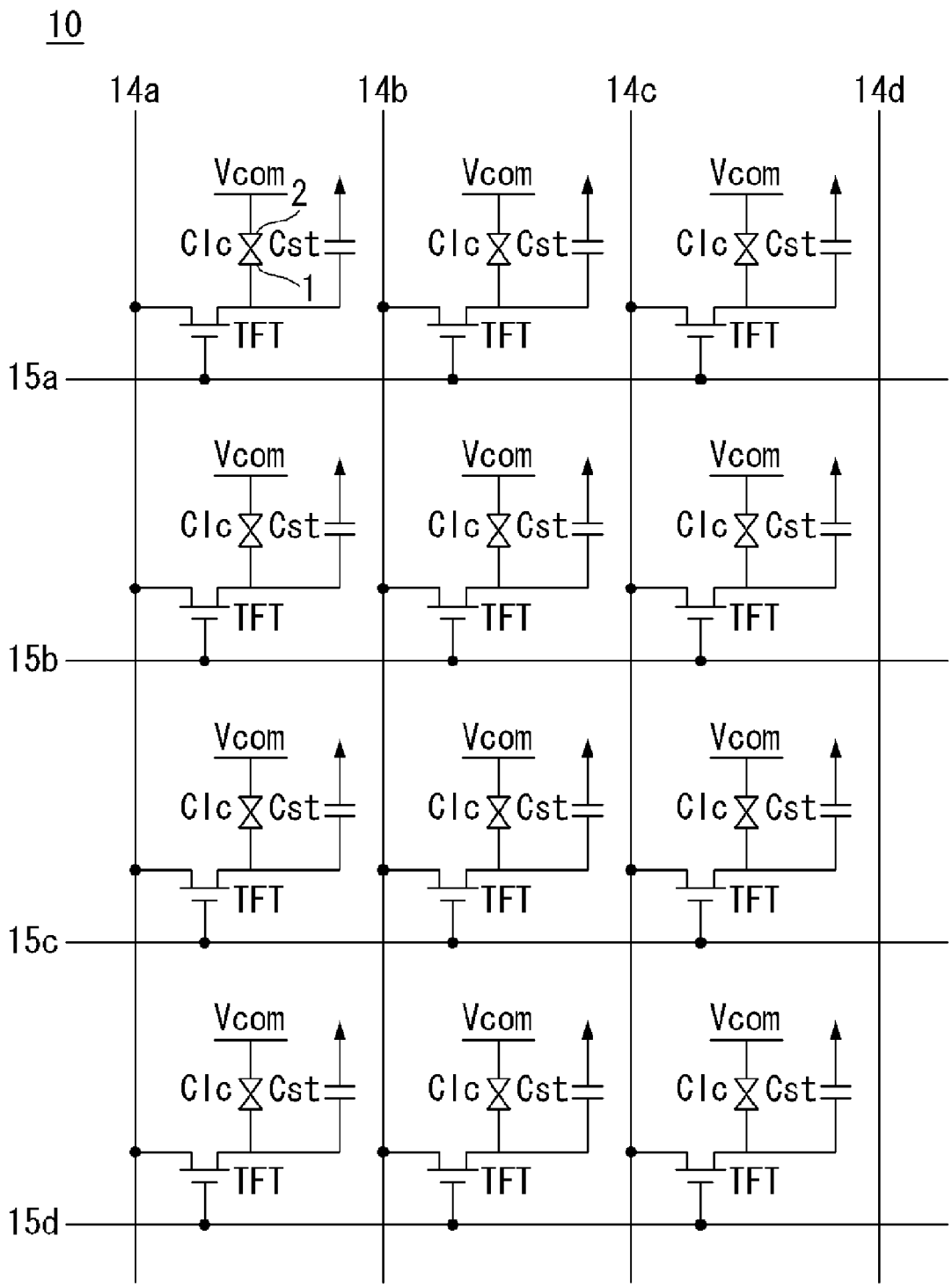
FIG. 2 is an equivalent circuit of a part of pixel array of the liquid crystal display shown in FIG. 1.
Figure 3:
FIG. 3 is a diagram illustrating a light guide plate part divided in a plurality of blocks.

Referring to FIGS. 1 to 3, a liquid crystal display according to an exemplary embodiment of the invention comprises a liquid crystal display panel 10, a data driving part 12 for driving data lines 14 of the liquid crystal display panel 10, a gate driving part 13 for driving gate lines 15 of the liquid crystal display panel 10, a timing controller 11 for controlling the data driving part 12 and the gate driving part 13, a backlight unit for illuminating light to the liquid crystal display panel 10, first and second light array driving parts 21 and 22 for first and second driving light arrays 23 and 24 of the backlight unit, and a dimming controller 16 for analyzing an input picture and controlling the first and second light array driving parts 21 and 22 according to the analyzed result.

The liquid crystal display panel 10 includes liquid crystal layer formed between an upper glass substrate and a lower glass substrate. A plurality of data lines 14a to 14d are intersected with a plurality of gate lines 15a to 15d each other on the lower glass substrate as shown in FIG. 2. Liquid crystal cells Clc are arranged in the liquid crystal display panel 10 in a matrix type by the intersection of the data lines and the gate lines. Also, thin film transistors (TFTs), pixel electrodes 1 of the liquid crystal cells Clc connected to the TFTs, and storage capacitors are formed on the lower glass substrate.

Black matrices, color filters and common electrodes 2 are formed on the upper substrate. The common electrode 2 is formed on the upper substrate in a vertical electrical field type driving method such as a twisted nematic (TN) mode and a vertical alignment (VA) mode, however is formed on the lower glass substrate together with the pixel electrode 1 in a horizontal electrical field type driving method such as an in-plane switching (IPS) mode and a fringe field switching (FFS) mode. Polarizers are formed on the upper and lower glass substrates, respectively, and alignment layers are respectively formed on the inner surfaces of the substrates abutting with liquid crystals to set pre-tilt angle of the liquid crystals.

The data driving part 12 comprises a plurality of data driving integrated chips (ICs). Each of the plurality of data driving ICs includes a shift register for sampling a clock signal, a data register for temporarily storing the digital picture data RGB, a latch for storing the digital picture data by one line at a time in response to the clock signals supplied from the shift registers and outputting the stored digital picture data, a digital/analog converter for selecting a positive polarity gamma compensating voltage or a negative polarity gamma compensating voltage corresponding to the digital picture data supplied from the latch by referring to the gamma reference voltage, a multiplexer for selecting the data line to which the analog data converted by the positive polarity gamma compensating voltage or the negative polarity gamma compensating voltage is supplied, and an output buffer connected between the multiplexer and the data line DL. The data driving part 12 latches the digital picture data RGB under the control of the timing controller 11, converts the latched digital picture data into a positive or negative polarity analog data voltage using the positive or negative polarity gamma compensating voltage, and outputs the positive or negative polarity analog data voltage to the data lines 14.

The gate driving part 13 comprises a plurality of gate driving integrated chips (ICs). Each of the plurality of gate driving ICs includes a shift register, a level shifter converting an output signal supplied from the shift register into a signal having a swing width adapted to drive the TFT, and an output buffer connected between the level shifter and the gate lines 15. The gate driving part 13 sequentially outputs gate pulses (or scan pulses) having a pulse width of about one horizontal period under a control of the timing controller 11 and supplies them to the gate lines 15.

The timing controller 11 receives the digital picture data RGB from a system board to which an external picture source is mounted, rearranges the digital picture data RGB to meet the resolution of the liquid crystal display panel 10, and outputs the rearranged digital picture data RGB to the data driving part 12. And, the timing controller 11 generates a data timing control signal DDC for controlling an operating timing of the data driving part 12 and a gate timing control signal GDC for controlling an operating timing of the gate driving circuit 13 based on the timing signals including a vertical synchronization singal Vsync, a horizontal synchronization singal Hsync, a data enable signal DE and a dot clock signal DCLK. The timing controller 11 inserts an interpolation frame between frames of the input picture signal which is input thereto in a frame frequency of 60 Hz, and controls the operation of the data driving part 12 and the gate driving part 13 in a frame frequency of 60*N (herein, N is an integer of two or more) by multiplexing the data timing control signal DDC and the gate timing control signal GDC.

The backlight unit includes a light guide plate part 20, and the first and second light arrays 23 and 24 for illuminating light to a side of the light guide plate part 20. Also, the backlight unit includes a plurality of optical sheets disposed between the light guide plate part 20 and the liquid crystal display panel 10. In order to implement the local dimming by dividing the surface light incident to the liquid crystal display panel 10 into blocks as shown in FIG. 3, a structure of the light guide plate 20 and an arrangement of the first and second light arrays 23 and 24 may be changed in various.

Figure 8:
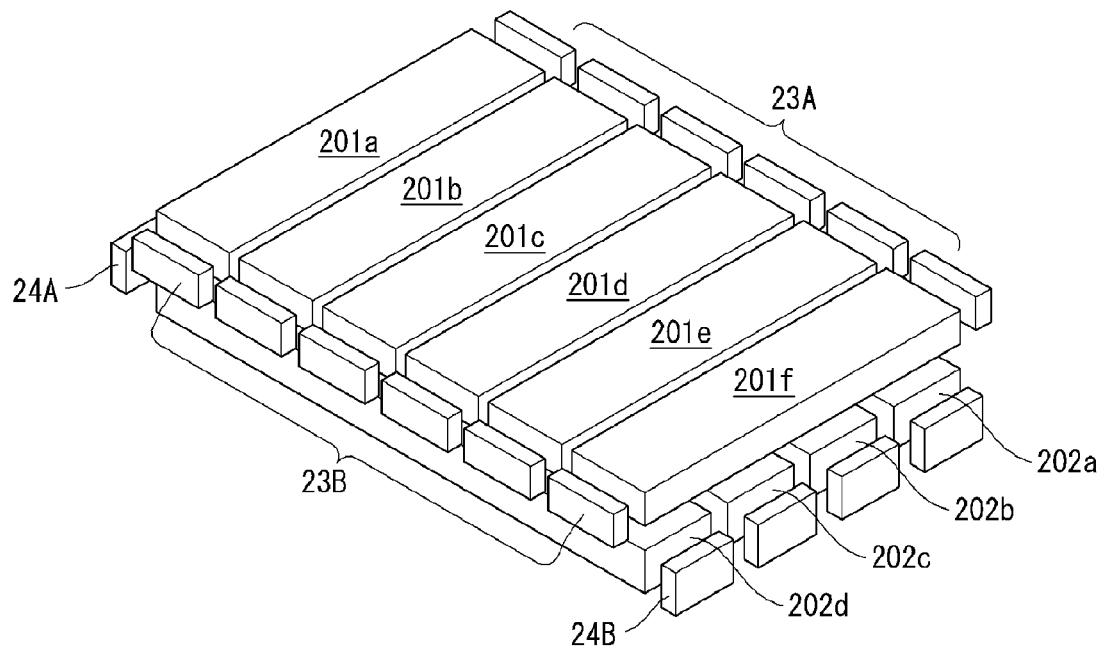
FIGS. 8 and 9 are perspective views which illustrate a construction of a light guide plate part and an arrangement of first and second light array according to a first exemplary embodiment of the invention.
Figure 9:
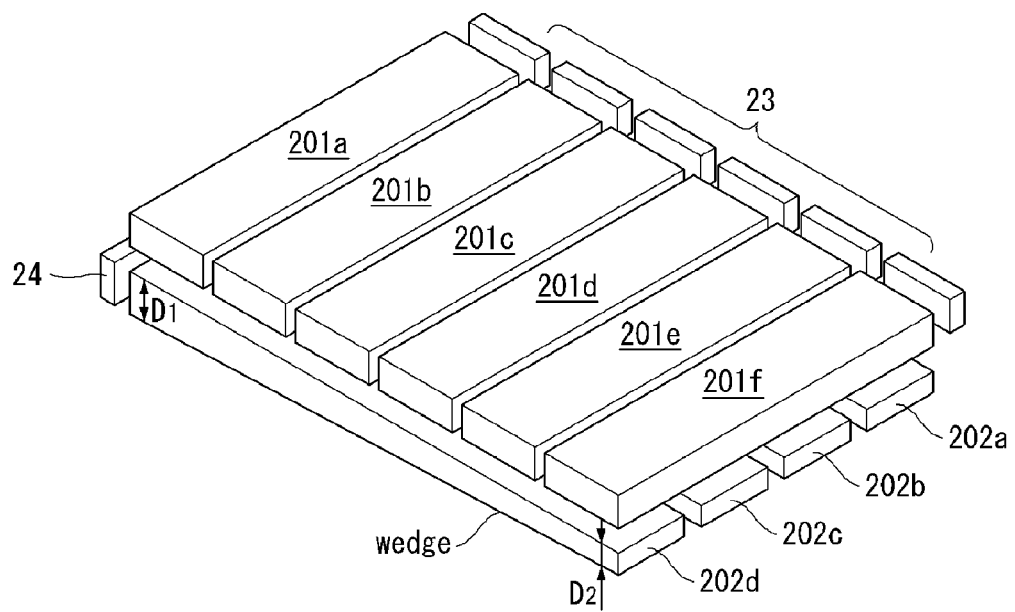
Figure 10A:
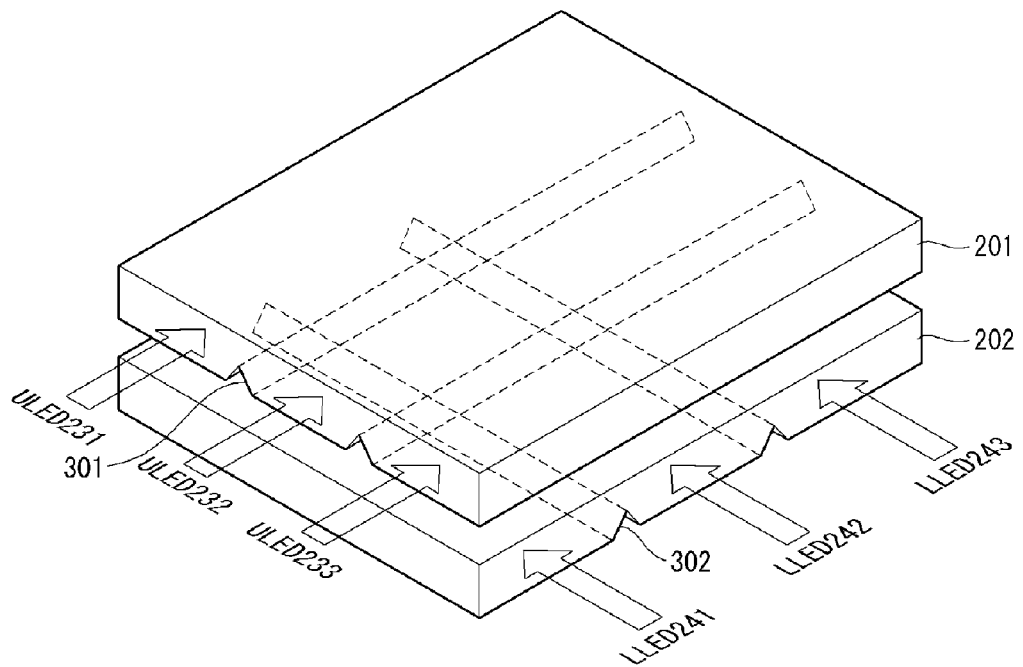
FIGS. 10A to 12 are diagrams which illustrate a part of a light guide plate part according to a second exemplary embodiment of the invention.
Figure 10B:
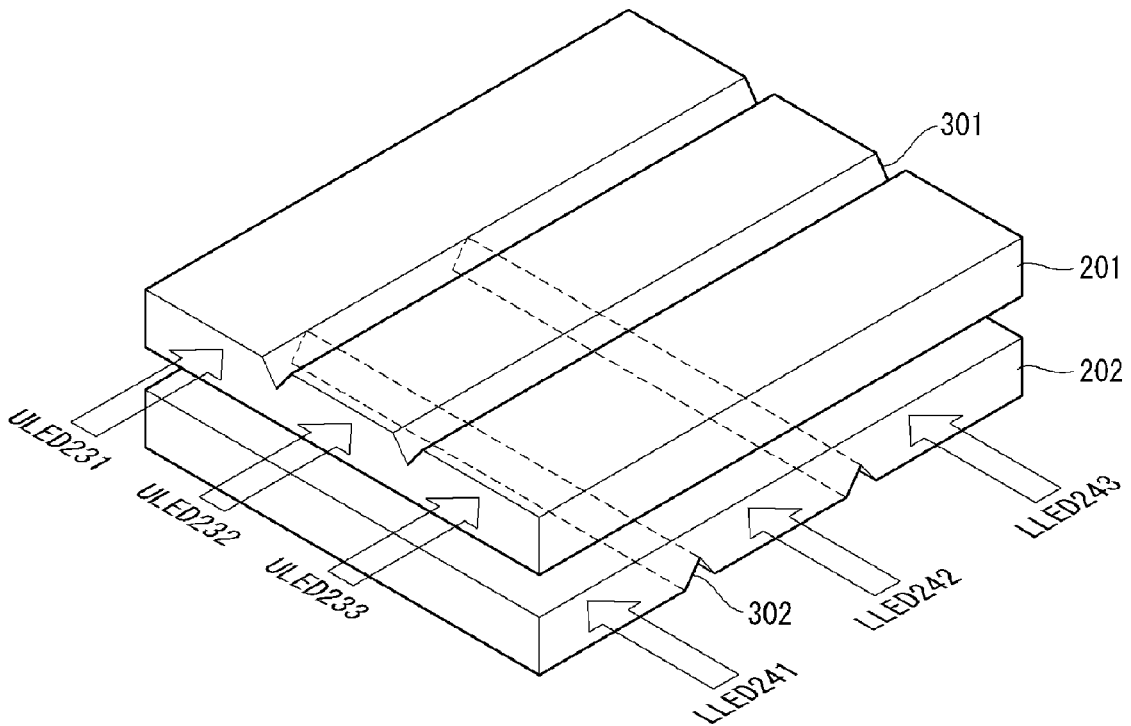
Figure 10C:
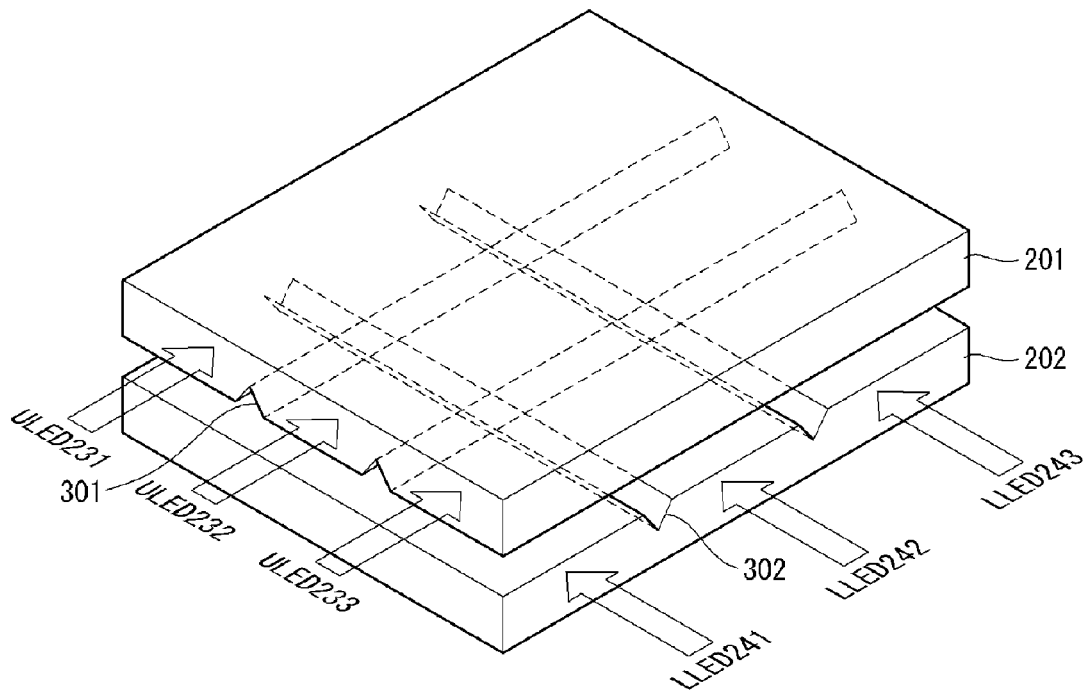
Figure 10D:
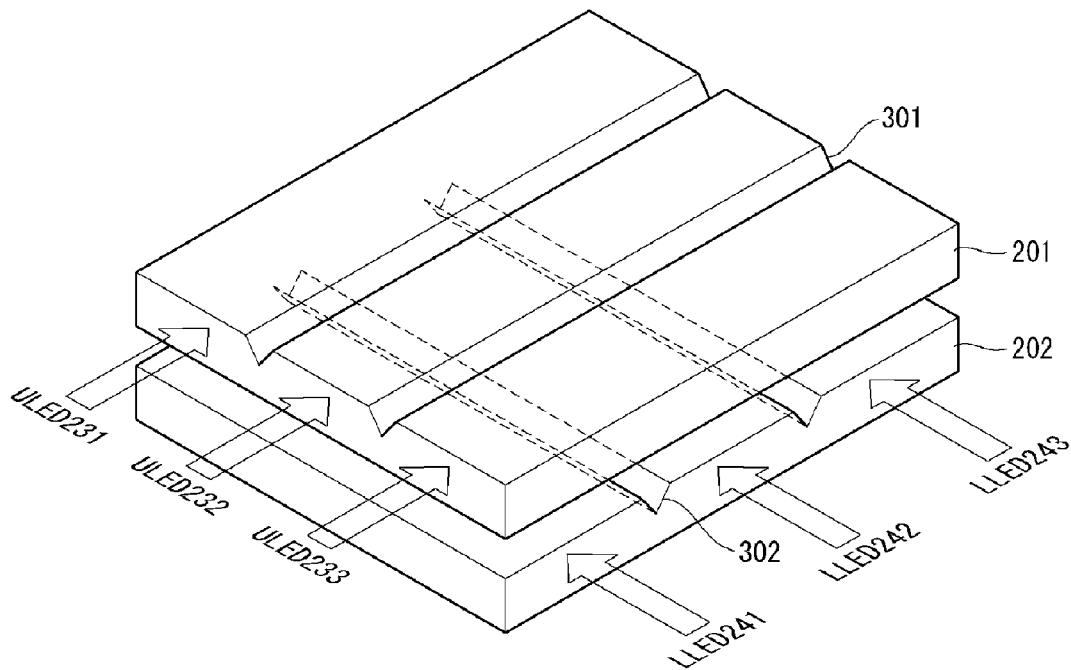

As one example, the light guide plate part 20 includes a first light guide plate array and a second light guide plate array disposed under the first light guide plate array. As shown in FIGS. 8 and 9, the first light guide plate array includes a plurality of first light guide plates 201a to 201f divided in a column direction (or a row direction) and arranged in parallel one another to define a first light guide channels. The second light guide plate array includes a plurality of second light guide plates 202a to 202d divided in a row direction (or a column direction) perpendicular to the first light guide plates 201a to 201f and arranged in parallel one another to define a second light guide channels. In this case, the first light array 23 may be disposed to face at least one end of the first light guide plates 201a to 201f in order to illuminate light to the first light guide channels, and the second light array 24 may disposed to face at least one end of the second light guide plates 202a to 202d in order to illuminate light to the second light guide channels.

As another example, the light guide plate part 20 includes a first light guide plate 201 and a second light guide plate 202 disposed under the first light guide plate 201. As shown in FIGS. 10A to 10D, the first light guide plate 201 includes a plurality of first intaglio patterns 301 formed in parallel on surface thereof to define a first light guide channels. The second light guide plate 202 includes a plurality of second intaglio patterns 302 formed in parallel on surface thereof and perpendicular to the first intaglio patterns 301 to define a second light guide channels. In this case, the first light array 23 may be disposed to face at least one end of the first light guide plate array in order to illuminate light to the first light guide channels, and the second light array 24 may disposed to face at least one end of the second light guide plate array in order to illuminate light to the second light guide channels.

Figure 13A:
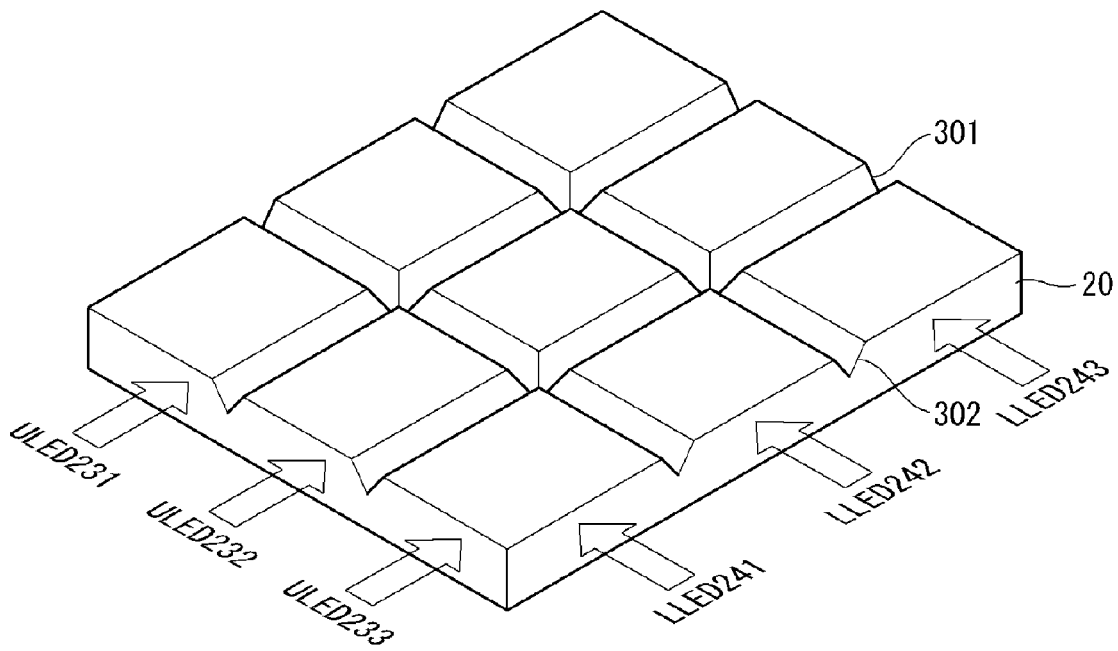
FIGS. 13A and 13B are diagrams which illustrate a part of a light guide plate part according to a third exemplary embodiment of the invention.
Figure 13B:
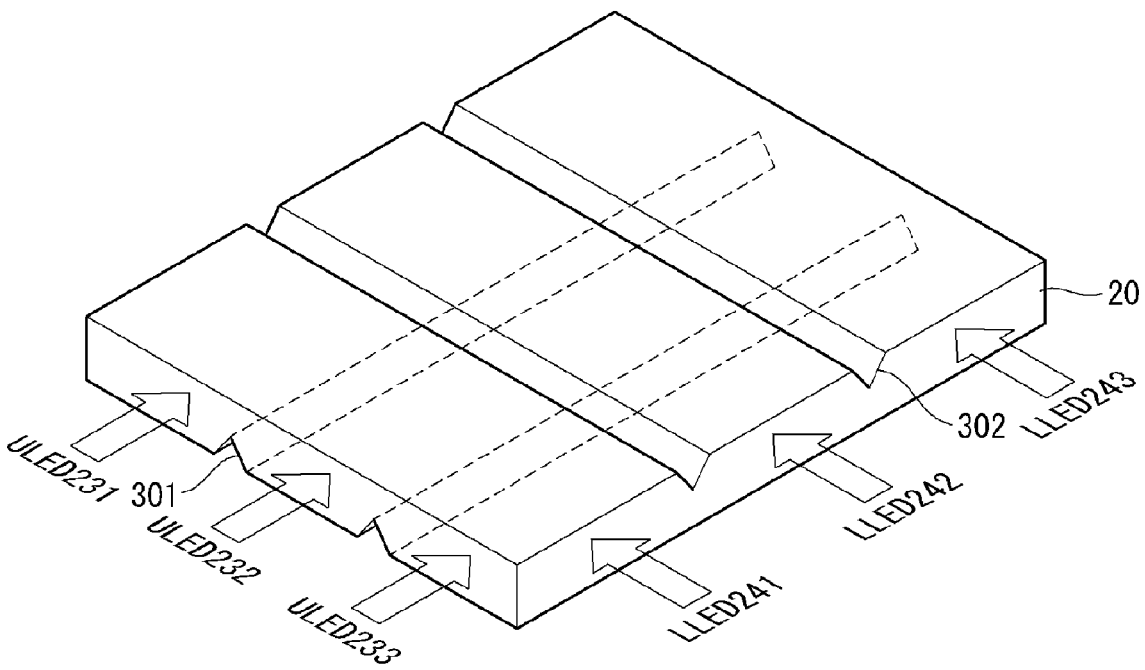

As another example, the light guide plate part 20 may be consisted of single light guide plate 20. As shown in FIGS. 13A to 13B, the light guide plate 20 includes a plurality of first intaglio patterns 301 formed in parallel on surface thereof to define a first light guide channels and a plurality of second intaglio patterns 302 formed in parallel on the surface or an opposing surface and perpendicular to the first intaglio patterns 301 to define a second light guide channels. In this case, the first light array 23 may be disposed to face one side of the light guide plate 20 in order to illuminate light to the first light guide channels, and the second light array 24 may disposed to face another side of the light guide plate 20 in order to illuminate light to the second light guide channels.

The structure of the light guide plate part 20 and arrangement of the first and second light array 23 and 24 will be described in detail with reference to accompanying drawings.

On the other hand, the blocks B11 to B46 shown in FIG. 3 indicates luminance blocks of the light guide plate part 20 divided into a matrix type by the first light guide channels and the second light guide channels which are cross each other. The number of the blocks may be changed according to a model of the liquid crystal display and number of light sources in the first and second light arrayS.

The first light array driving part 21 adjusts an intensity of current to be supplied to each light source of the first light array 23 under the control of the dimming controller 16. The first light array driving part 21 adjusts the current supplied to a first light source of the first light array 23 which undertakes the blocks corresponding to a bright area displayed on the display screen of the liquid crystal display panel 10 depending on a local dimming signal LDIM supplied from the dimming controller 16 so that the current supplied to the first light source is high. On the other hand, the first light array driving part 21 adjusts the current supplied to a second light source of the first light array 23 which undertakes the blocks corresponding to a dark area displayed on the display screen of the liquid crystal display panel 10 depending on a local dimming signal LDIM supplied from the dimming controller 16 so that the current supplied to the second light source is low.

The second light array driving part 22 adjusts an intensity of current to be supplied to each light source of the second light array 24 under the control of the dimming controller 16. The second light array driving part 22 adjusts the current supplied to a third light source of the second light array 204 which undertakes the blocks corresponding to a bright area displayed on the display screen of the liquid crystal display panel 10 depending on the local dimming signal LDIM supplied from the dimming controller 16 so that the current supplied to the third light source is high. On the other hand, the second light array driving part 22 adjusts the current supplied to a fourth light source of the second light array 204 which undertakes the blocks corresponding to a dark area displayed on the display screen of the liquid crystal display panel 10 depending on a local dimming signal LDIM supplied from the dimming controller 16 so that the current supplied to the fourth light source is low.

The dimming controller 16 analyzes the digital picture data RGB input from the system board, maps the input digital picture data to the blocks B11 to B46 shown in FIG. 3 based on the analyzed result, and analyzes the luminance of the input digital picture data in a block unit using a diversity of picture analysis methods. The dimming controller 16 pre-determines a first dimming value for controlling any one of the first light array 23 and the second light array 24 which illuminates light to any one of the first light guide channels and the second light guide channels with reference to the luminance analyzed in the block unit, determines a second dimming value for controlling the other one of the first light array 23 and the second light array 24 which illuminates light to the other one of the first light guide channels and the second light guide channels based on the first dimming value, and adjusts the first and second dimming values in order to reduce a luminance difference between a target block and blocks neighboring to the target block. And, the dimming controller 16 controls the first and second light array driving parts 21 and 22 using the adjusted first and second dimming values as a local dimming signal LDIM. The dimming controller 16 is also synchronized with the timing controller 11 by the timing signals Vsync, Hsync, DE and DCLK to synchronize the driving timing of the first and second light arrays 23 and 24 with the displaying timing of the digital picture data RGB. The dimming controller 16 may be mounted to the external system board or be integrated into the timing controller 11.

Hereinafter, processes of determining and adjusting the dimming values of the dimming controller 16 will be described in detail with reference to FIGS. 4 to 7B.

Figure 4:
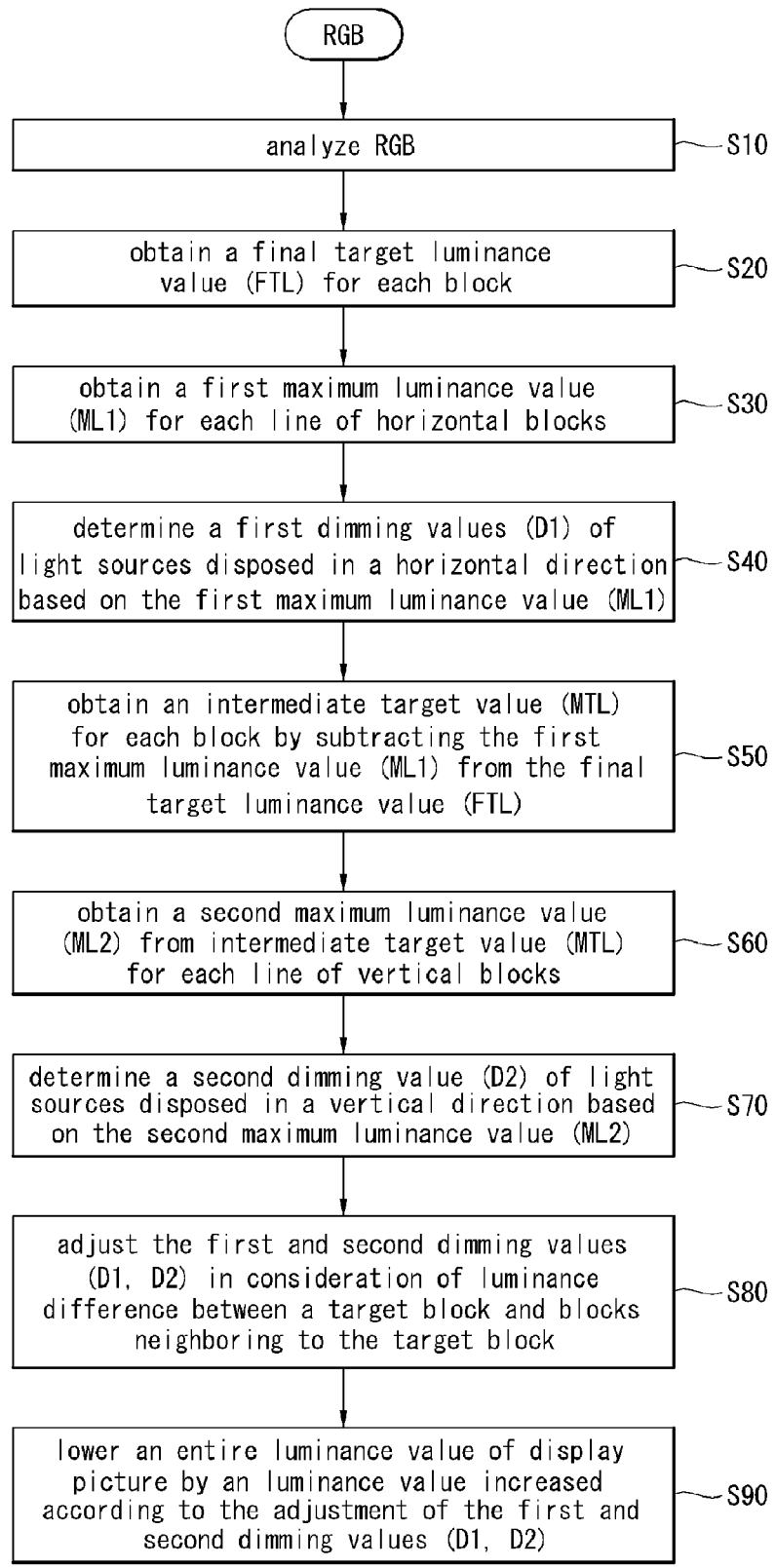
FIG. 4 is a flow chart illustrating a process of determining and adjusting dimming value by a dimming controller.
Figures 5A, 5B, 5C:
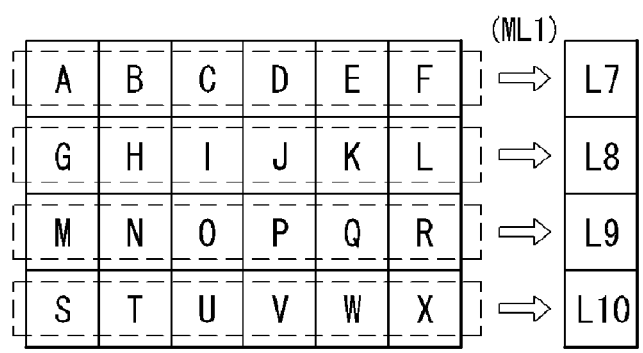
FIG. 5A is a diagram which illustrates final target luminance values of blocks determined based on an input picture analysis.
FIG. 5B is a diagram which illustrates a process of determining a first dimming value after calculating a first maximum luminance value for each horizontal line block.
FIG. 5C is a first lookup table for outputting the first dimming value using the first maximum luminance value as address.

Referring to FIG. 4, the dimming controller 16 analyzes the digital picture data RGB input from the system board, maps the input digital picture data to the blocks B11 to B46 shown in FIG. 3 based on the analyzed result, and analyzes the luminance of the input digital picture data for each of the blocks using a diversity of picture analysis methods to obtain a final target luminance value FTL for each block shown FIG. 5A (S10, S20). The final target luminance value FTL may be obtained based on an average luminance value of the digital picture data RGB corresponding to each block or a maximum value of the digital picture data RGB corresponding to each block. The final target luminance value FTL may be obtained based on the most frequent value of the digital picture data RGB corresponding to each block by a histogram analysis result. In FIG. 5A, letters "A" to "X" indicate final target luminance values FTLs for the blocks B11 to B46, respectively.

The dimming controller 16 sequentially compares the final target luminance values FTLs between blocks neighboring in a first direction (e.g. horizontal direction), obtains a first maximum luminance value ML1 for each of line blocks (A to F, G to L, M to R, and S to X) of the first direction as shown in FIG. 5A, respectively, and determines the first dimming value D1 for controlling the light sources corresponding to the line blocks of the first direction based on the first maximum luminance value ML1 (S30, S40). In FIG. 5B, letters "L7" to "L10" indicate the first dimming values D1 for controlling the light sources which respectively illuminate light to four light guide channels corresponding to four line blocks of the first direction. In order to determine the first dimming values D1, the dimming controller 16 may use a first lookup table shown in FIG. 5C. The first lookup table may be pre-set by an user so that the first dimming value D1 which controls the luminance value of the corresponding light source using the first maximum luminance value ML1 as addresses is output. Each of the final target luminance values FTL is determined by adding a first luminance value (i.e. first maximum luminance ML1) corresponding to the first dimming value D1 to a second luminance value (i.e. second maximum luminance ML2) corresponding to the second dimming value which will be described later. Accordingly, if the first maximum luminance value is lower than a predetermined level (e.g. 153 lm) as shown in FIG. 5C, the first dimming value D1 may be set so that the luminance value of the corresponding light source has the lowest level (off level). Because it is possible to achieve the final target luminance value by only the second dimming value D2. The dimming curve of the light sources controlled by the first dimming value D1 may be changed according to the luminance property of the light sources.

Figures 5D, 5E, 5F:
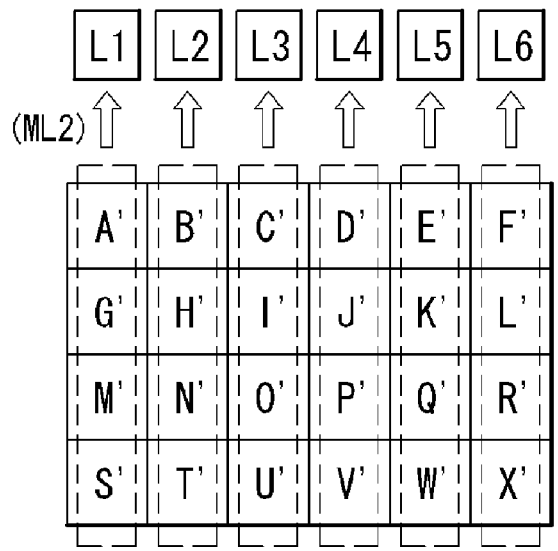
FIG. 5D is a diagram which illustrates a process of determining an intermediate target luminance values by subtracting the first maximum luminance value from the final target luminance value.
FIG. 5E is a diagram which illustrates a process of determining a second dimming value after calculating a second maximum luminance value for each vertical line block.
FIG. 5F is a second lookup table for outputting the second dimming value using the second maximum luminance value as address.

As shown in FIG. 5D, the dimming controller 16 obtains intermediate target luminance value MTL (A' to X') for each block by subtracting the first maximum luminance value ML1 from the final target luminance value FTL (S50). In FIG. 5D, letters "A'" to "X'" indicate intermediate target luminance values for the blocks B11 to B46, respectively. For example, the intermediate target luminance value "A'" of the block B11 is obtained by subtracting the first dimming value "L7" from the final target luminance value "A", and the intermediate target luminance value "X'" of the block B46 is obtained by subtracting the first dimming value "L10" from the final target luminance value "X". In the obtained values, the block having a negative value means that the block satisfies the final target luminance value, but the block having a positive value means that the block does not satisfy the final target luminance value. In the block having the negative value, the intermediate target luminance value MTL may be replaced with "0".

The dimming controller 16 sequentially compares the intermediate target luminance values MTLs of blocks neighboring in a second direction (e.g. vertical direction), obtains second maximum luminance value ML2 for each line blocks of the second direction as shown in FIG. 5E, and determines the second dimming value D2 for controlling the light source corresponding to the line block of the second direction based on the second maximum luminance value ML2 (S60, S70). In FIG. 5E, letters "L1" to "L6" indicate the second dimming values D2 for controlling the light sources which illuminate light to the light guide channels corresponding to six line blocks arranged in the second direction (that is, vertical direction). In order to determine the second dimming values D2, the dimming controller 16 may use a second lookup table shown in FIG. 5F. The second lookup table may be pre-set by the user so that the second dimming values D2 which control the luminance values of the corresponding light sources using the second maximum luminance value ML2 as address are output. The final target luminance values A to X are determined by adding the first maximum luminance values ML1 obtained based on the first dimming values D1 to a second maximum luminance values ML2 obtained based on the second dimming values D2. Accordingly, the second dimming value D2 controls the light source corresponding to the second maximum luminance value ML2 which is lower than the first maximum luminance values ML1 as shown in FIG. 5F. The dimming curve of the light sources controlled by the second dimming value D2 may be changed according to the luminance property thereof.

Even though the above-mentioned exemplary embodiment of the invention describes the process of pre-determining the first dimming values D1 for controlling the light sources which illuminate light to the horizontal direction light guide channels and then determining the second dimming values D2 for controlling the light sources which illuminate light to the vertical direction light guide channels, the invention does not be limited thereto. The invention may be applied to a process of pre-determining the first dimming values D1 for controlling the light sources which illuminate light to the vertical direction light guide channels and then determining the second dimming value D2 for controlling the light sources which illuminate light to the horizontal direction light guide channels.

Figures 5G, 5H:
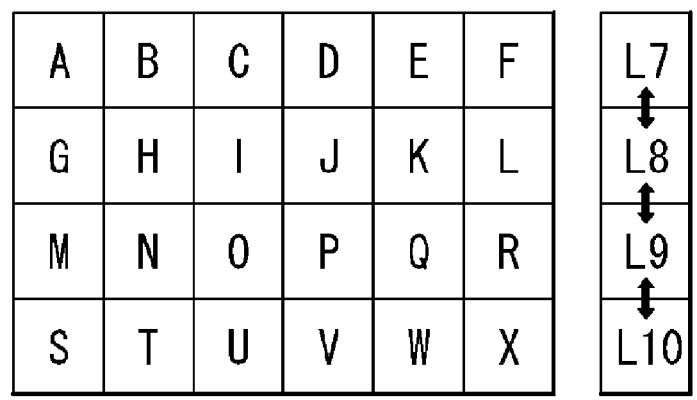
FIG. 5G is a diagram which illustrates a process of adjusting the first and second dimming values in consideration of a luminance difference between a target block and blocks neighboring to the target block.
FIG. 5H is a third lookup table for outputting a neighboring dimming value using reference value as address.
Figures 6A, 6B, 6C:
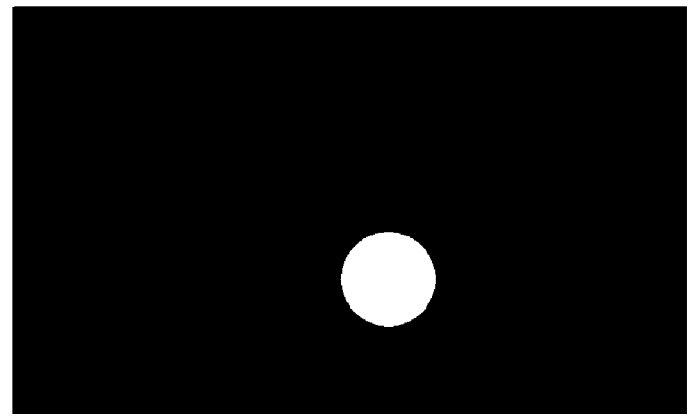
FIG. 6A is a diagram which illustrates one example of the display picture.
FIG. 6B is a luminance distribution diagram of blocks determined by the first and second dimming values in order to implement the display picture shown in FIG. 6A.
FIG. 6C is a luminance distribution diagram of blocks determined by the first and second dimming values in order to adjust a distortion of the display picture.
Figure 7A:
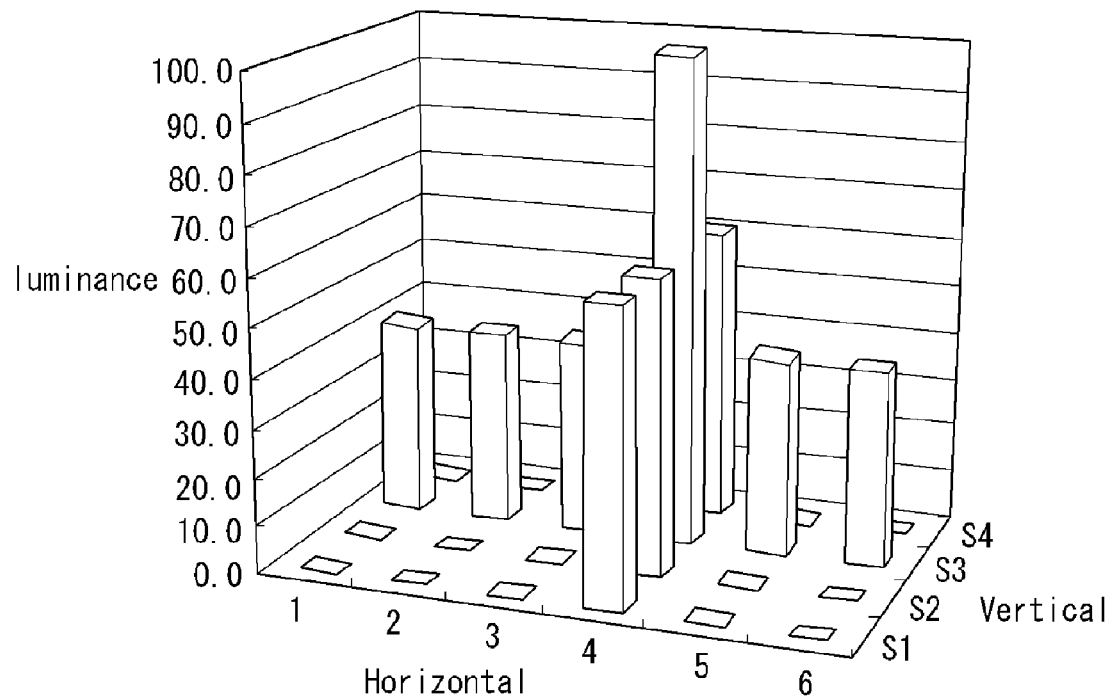
FIG. 7A is a diagram which spatially illustrates the luminance distribution diagram of blocks shown in FIG. 6B.
Figure 7B:
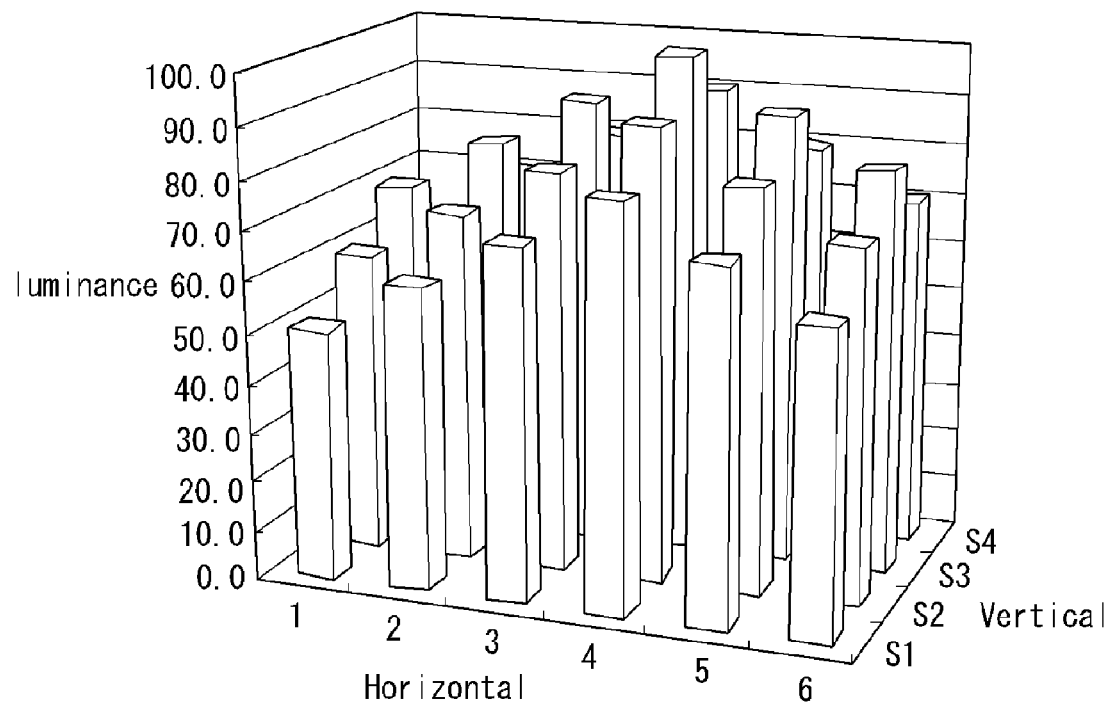
FIG. 7B is a diagram which spatially illustrates the luminance distribution diagram of blocks shown in FIG. 6C.

Referring to FIG. 5G, the dimming controller 16 adjusts the first and second dimming values D1 and D2 in consideration of the luminance difference between a target block and blocks neighboring to the target block after the first and the second dimming values D1 and D2 are determined (S80). The reason why the first and second dimming values D1 and D2 are adjusted is to reduce the luminance difference between the target block and blocks neighboring to the target block. In one example, when a picture as shown in FIG. 6A is displayed on a display screen, it is perceived undesired bright lines on the display screen if the light sources corresponding to the blocks B11 to B46 as shown in FIG. 6B are division-driven according to the first and the second dimming values D1 and D2 for luminance distribution for each block. If the luminance difference between the target block and blocks neighboring to the target block are increased, it is generated light and shade on unwanted area of the display screen, thereby causing interference to the picture to be displayed on the liquid crystal display panel. However, when the luminance difference between the target block and blocks neighboring the target block is reduced, it is possible to prevent the bright lines from being perceived on the display screen and also to prevent the luminance from being lowered by the division-driving as shown in FIGS. 6C and 7B. As known from FIG. 7B, when the first and second dimming values D1 and D2 are adjusted, the distribution of luminance between neighboring blocks has a linear property so that the change of the luminance is smoothly displayed. In order to adjust the first and second dimming values D1 and D2, the dimming controller 16 may use a third lookup table as shown in FIG. 5H. The third lookup table may be pre-set by the user so that neighboring dimming values for adjusting the first and second dimming values D1 and D2 using reference dimming values as address are output. Here, the reference dimming values indicate the first and second dimming values D1 and D2 which are determined at steps S40 and S70, and the neighboring dimming values indicate luminance values (hereinafter, referred as surrounding luminance values) around the blocks driven by the first and second dimming values D1 and D2. The surrounding luminance values are set so that a difference between the luminance values determined according to the reference dimming values and the surrounding luminance values is a predetermined threshold luminance value or less. The predetermined threshold luminance value is determined by an experiment which changes the reference dimming values, measures the luminance value according to the changed reference dimming values, and measures the luminance values of the corresponding blocks and the surrounding luminance values around the corresponding blocks. The predetermined threshold luminance value may be determined at a level that the luminance values of the blocks changed according to the reference dimming values are not definitely different from the surrounding luminance values by a subjective valuation method, that is, a valuation method using eyes of an observer. For example, if the dimming value of the second light source neighboring to the first light source is the threshold luminance value, that is, "204" or more in case that the dimming value of the first light source is "255" shown in FIG. 5H, it is possible to prevent a distortion of the display picture due to the luminance difference. The threshold luminance value may be differently determined depending on models, resolutions, and application devices of the display panel.

Figure 5I:
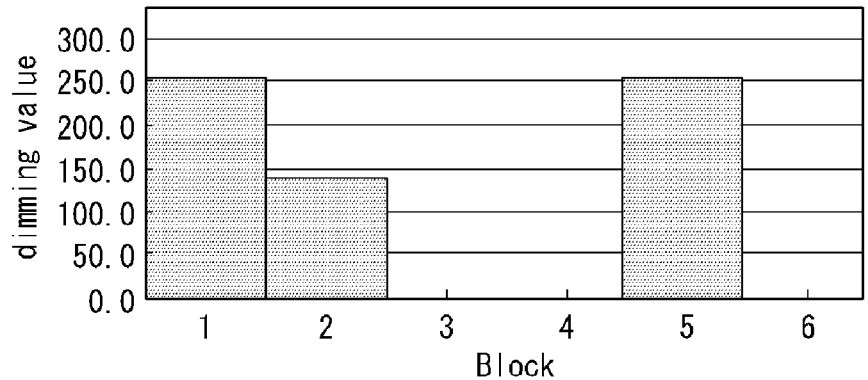
FIGS. 5I to 5K are diagrams which illustrates a luminance increase state of a display picture caused by adjustment of the first and second dimming values and a cancellation state of the increased luminance.
Figure 5J:
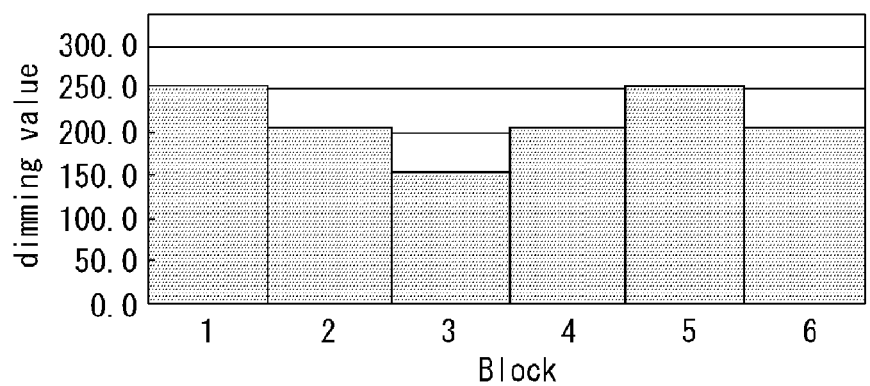
Figure 5K:
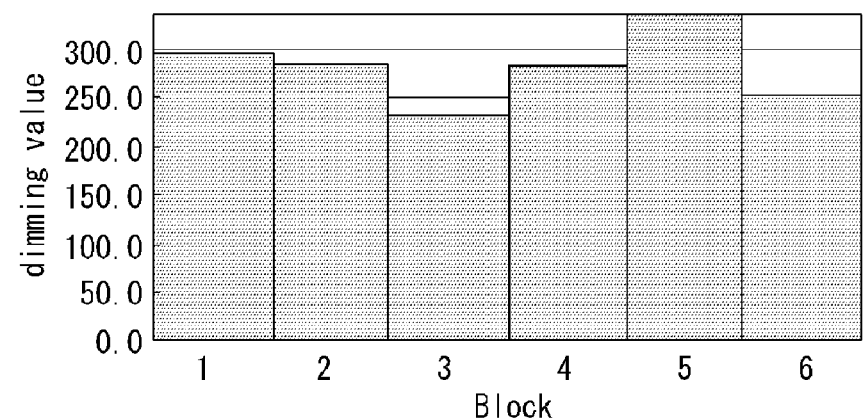

As thus, when the first and second dimming values D1 and D2 are adjusted, the amount of the light illuminated through the backlight unit is entirely increased. The increased light amount has influence on the surrounding area as well as the corresponding area. Accordingly, a real luminance on the display screen is increased over a required level. Because it causes power consumption to be increased, it is necessary to reduce an entire display luminance by the amount of the increased luminance. The dimming controller 16 stores information about the luminance increased according to the adjustment of the first and second dimming values D1 and D2, and controls the light array driving parts so that the entire luminance on the display screen is lowered by the increased luminance amount based on the stored information (S90). For example, in case that the dimming values of six areas corresponding to the vertical line blocks are determined as shown in FIG. 5I, new dimming values which are determined after the adjustment of the dimming values are completed are increased as shown in FIG. 5J. Here, if the luminance increased according to the adjustment of the dimming values has influence on neighboring areas by M % (herein, M is an integer), the real display luminance exceeds a required level by M % as shown in FIG. 5K. Accordingly, if the luminance corresponding to the increased amount of M % is reduced by decreasing a current (or voltage) supplied to the light sources under the control of the light array driving parts, it is possible to implement the division-driving of the display panel at the required luminance level. According to the above-mentioned process of cancelling the increased luminance, it is possible to reduce the power consumption to about 25% compared to the global driving method as well as to obtain the same picture as that obtained from the global driving method.

Hereinafter, a variety of examples for the construction of the light guide plate 20 and/or arrangement of the first and second light arrays 23 and 24 will be described in detail.

First Exemplary Embodiment for Light Guide Plate Part and Light Arrays

FIGS. 8 and 9 illustrates for constructions of the light guide plate part 20 and/or arrangements of the first and second light arrays 23 and 24

Referring to FIGS. 8 and 9, the light guide plate part 20 includes a first and second light guide arrays.

The first light guide array includes a plurality of first light guide plates 201a to 201f divided in a vertical direction. The first light guide plates 201a to 201f are arranged in parallel along a vertical direction to define vertical light guide channels in the first light guide plate array 201.

The second light guide plate array is arranged under the first light guide plate array. The second light guide plate array includes a plurality of second light guide plates 202a to 202d divided in a horizontal direction. The second light guide plates 202a to 202d are arranged in parallel in a horizontal direction to define horizontal light guide channels in the second light guide plate array.

The first light guide plates 201a to 201f and the second light guide plates 202a to 202d are arranged to be crossed each other and form the matrix type blocks B11 to B46 as shown in FIG. 3. The local dimming is implemented by dividing the surface light incident to the liquid crystal display panel 10 to correspond to the blocks B11 to B46. The first light guide plates 201a to 201f and the second light guide plates 202a to 202*d* may have minute intaglio or embossed patterns which are formed on upper surfaces and/or lower surfaces thereof respectively. The minute intaglio or embossed patterns reflects light from the light guide channels defined by the light guide plates to the optical sheets and the liquid crystal display panel 10. The more minute intaglio or embossed patterns are far from the first and second light arrays 23 and 24, the more minute intaglio or embossed patterns are formed in dense. It compensates the luminance at the position far from the light sources to satisfy the evenness of the surface luminance in each of the light guide channels. The first light guide plates 201*a* to 201*f* and the second light guide plates 202*a* to 202*d* are made of a transparent flat plate resin, respectively. Otherwise, the first light guide plates 201*a* to 201*f* are made of transparent flat plate resin, and the second light guide plates 202*a* to 202*d* are made of a wedge plate of which lower surface is inclined.

Each of the first and second light arrays includes a plurality of point light sources such as light emitting diodes (LEDs).

The first light array 23 includes a 1-1 light array 23A disposed to face one end of the first light guide plate array including the first light guide plates 201*a* to 201*f* and a 1-2 light array 23B disposed to face the other end of the light guide plate array including the first light guide plates 201*a* to 201*f* as shown in FIG. 8. Otherwise the first light array 23 may be disposed to face only one of both ends of the first light guide plate array as shown in FIG. 9. In case of that the light sources of the first light array 23 are disposed to face only one ends of the first light guide plates 201*a* to 201*f*, respectively, each of the first light guide plates 201*a* to 201*f* is preferably made of the transparent flat plate resin to secure a coupling stability in relation with the second light guide plates 202*a* to 202*d* disposed thereunder. The amount of emitting light of each light source in the first light array 23 is independently controlled by current supplied from the first light array driving part 21. The light emitted from the first light array 23 is totally reflected in the first light guide plates 201*a* to 201*f* and is propagated along the light guide channels defined by the first light guide plates 201*a* to 201*f* in a high going-straight property.

The second light array 24 includes a 2-1 light array 24A disposed to face one end of the second light guide plate array including the second light guide plates 202*a* to 202*d* and a 2-2 light array 24B disposed to face the other end of the second light guide plate array including the second light guide plates 202*a* to 202*d* as shown in FIG. 8. Otherwise the second light array 24 may be disposed to face only any one of both ends of the second light guide plate array as shown in FIG. 9. In case of that the light sources of the second light array 24 are disposed to face only one ends of the second light guide plates 202*a* to 202*d*, respectively, each of the second light guide plates 202*a* to 202*d* is preferably made of the transparent wedge plate in which a first thickness D1 at the position near to the second light array 24 is thicker than a second thickness D2 at the position opposite to the second light array 24. The amount of emitting light of each light source in the second light array 24 is independently controlled by current supplied from the second light array driving part 22. The light emitted from the second light array 24 is totally reflected in the second light guide plates 202*a* to 202*d* and is propagated along the light guide channels defined by the second light guide plates 202*a* to 202*d* in a high going-straight property.

Second Exemplary Embodiment for Light Guide Plate Part and Light Arrays

FIGS. 10A to 12 illustrate a part of the light guide plate part 20 according to a second exemplary embodiment of the invention.

Referring to FIGS. 10A to 10D, the light guide plate part 20 includes first and second light guide plates 201 and 202.

Each of the first and second light guide plates 201 and 202 is made of a flat plate or wedge plate containing a transparent resin. The first light guide plate 201 is formed on the second light guide plate 202. Also, the first light guide plate 201 is made of the flat plate resin and the second light guide plate 202 is made of the wedge plate of which lower surface is inclined. The first light guide plate 201 includes a plurality of first intaglio patterns 301, and the second light guide plate 202 includes a plurality of second intaglio patterns 302. The first intaglio patterns 301 are intersected with the second intaglio patterns 302. The first intaglio patterns 301 are formed on at least one surface of the first light guide plate 201 as shown in FIGS. 10A to 10D. The second intaglio patterns 302 are formed on at least one surface of the second light guide plate 202 as shown in FIGS. 10A to 10D. In FIGS. 10A to 10D, letters ULED231 to ULED233 indicate light incident from the first light array 23 to the first light guide plate 201 and letters LLED241 to LLED243 indicate light incident from the second light array 24 to the second light guide plate 202.

Each of the first intaglio patterns 301 includes a first elongated groove which is formed on at least one surface of the first light guide plate 201 and has a depth less than the thickness of the first light guide plate 201. A first light guide channels are defined by the first intaglio patterns 301. Accordingly, the first intaglio patterns 301 divide the first light guide plate 201 into a plurality of vertical light guide channels. The first intaglio patterns 301 divide the light guide plate part 20 in a vertical direction as shown in FIGS. 10A to 10D. Each of the second intaglio patterns 302 includes a second elongated groove which is formed on at least one surface of the second light guide plate 202 and has a depth less than the thickness of the second light guide plate 202. A second light guide channels are defined by the second intaglio patterns 302. Accordingly, the second intaglio patterns 302 divide the second light guide plate 202 into a plurality of horizontal light guide channels. FIG. 3 illustrates the blocks B11 to B46 of the light guide plate part 20 formed by the first and second intaglio patterns 301 and 302. The local dimming is implemented by dividing the surface light incident to the liquid crystal display panel 10 to correspond to the blocks B11 to B46.

Each of the first and second light arrays 23 and 24 includes a plurality of point light sources such as light emitting diodes (LEDs). The light sources of the first light array 23 are disposed to face at least one side of the first light guide plate 201. The amount of emitting light of each light source in the first light array 23 is independently controlled by current supplied from the first light array driving part 21. In case of that the first light array 23 is disposed to face an upper side or lower side of the first light guide plate 201, the second light array 24 is disposed to face a left side or right side of the second light guide plate 202. Otherwise, In case of that the first light array 23 is disposed to face the left side or right side of the first light guide plate 201, the second light array 24 is disposed to face the upper side or lower side of the second light guide plate 202 in the drawings. If the second light array 24 is disposed to face any one side of the second light guide plate 202, the second light guide plate 202 is made of a wedge plate of which lower surface is inclined. The amount of emitting light of each light source in the second light array 24 is independently controlled by current supplied from the second light array driving part 22.

Figure 11A:
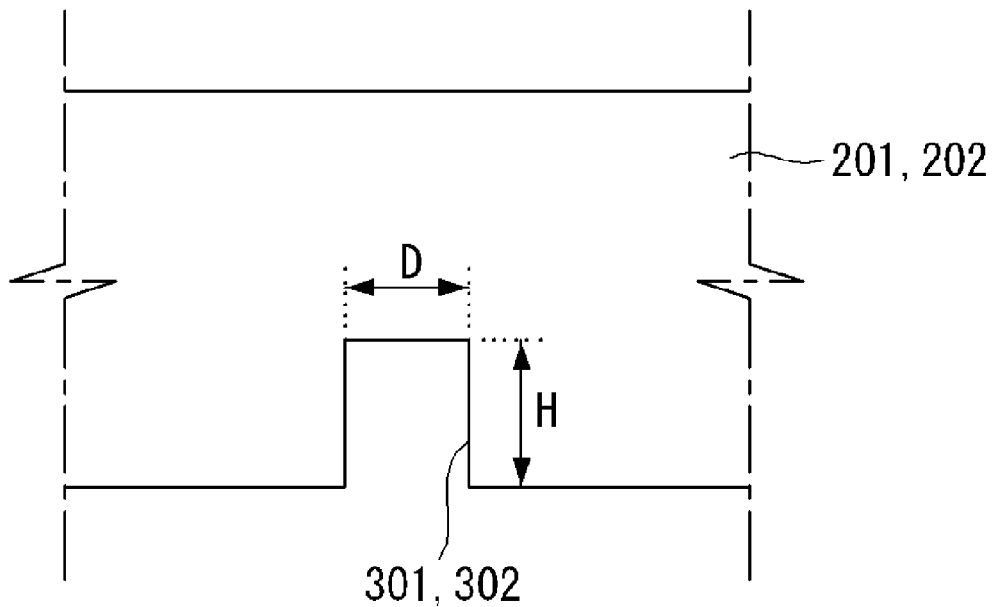
Figure 11B:
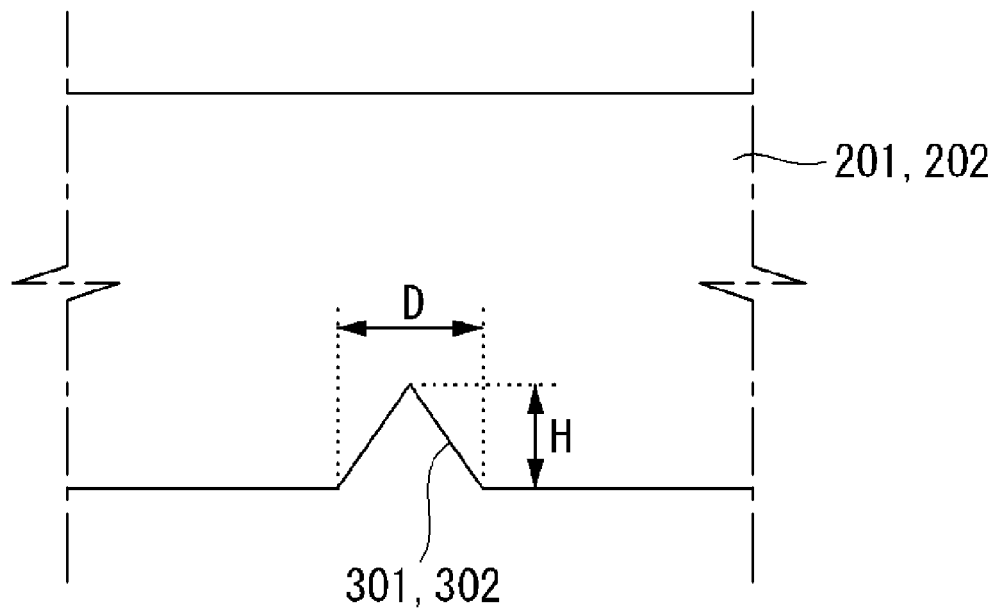
Figure 11C:
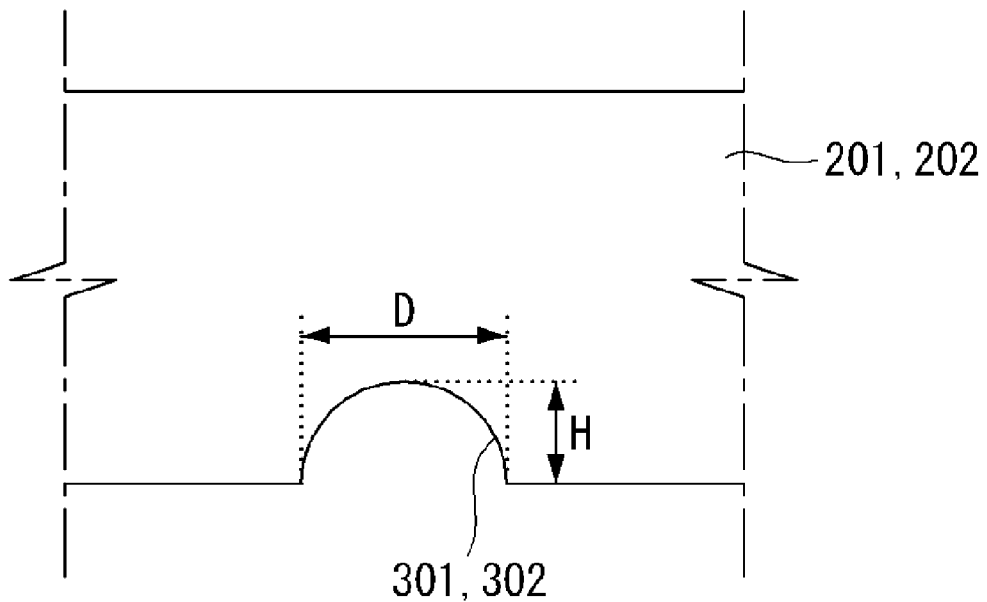

The first light array 23 emits light depending on current supplied from the first light array driving part 21 to propagate the light to the first light guide plate 201. The light emitted from the first light array 23 is totally reflected by the first intaglio patterns 301 to be propagated in a high going-straight property along the light guide channels defined by the first intaglio patterns. The second light array 24 emits light depending on current supplied from the second light array driving part 22 to propagate the light to the second light guide plate 202. The light emitted from the second light array 24 is totally reflected by the second intaglio patterns 302 to be propagated in a high going-straight property along the light guide channels defined by the second intaglio patterns 302. The first and second intaglio patterns 301 and 302 may be implemented in a variety of sectional shapes such as a rectangular shape, a triangular shape, a semi-spherical shape, an oval shape or a combination thereof as shown in FIGS. 11A to 11C. It is possible to adjust a depth H, width D and distance of the intaglio patterns 301 and 302 according to a block size shown in FIG. 3 and size and resolution of the liquid crystal display panel.

Figure 12:
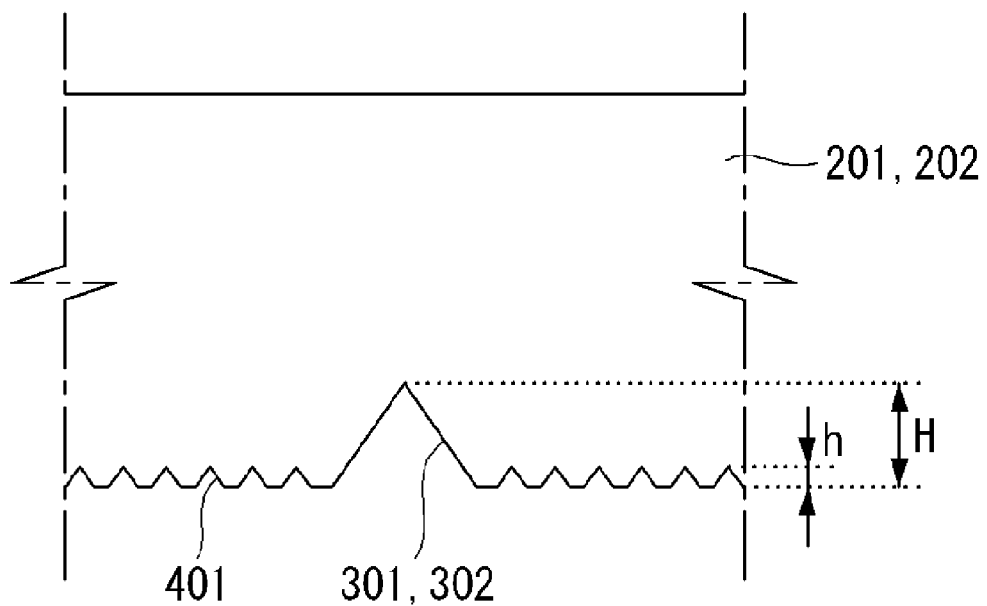

On each of the first and second light guide plates 201 and 202, minute intaglio or embossed patterns 401 in addition to the intaglio patterns 301 and 302 for defining the light guide channels may be formed as shown in FIG. 12. The minute intaglio or convex patterns 401 are formed at least one surface of each of the first and second light guide plates 201 and 202. The minute intaglio or embossed patterns 401 reflect the light in the light guide channels to the optical sheets and the liquid crystal display panel 10. The more minute intaglio or embossed patterns 401 are far from the first and second light arrays 23 and 24, the more minute intaglio or embossed patterns 401 are formed in dense. It compensates the luminance at the position far from the light sources to enhance the evenness of the surface luminance in each of the light guide channels. For example, in case that the first and second light arrays 23 and 24 are formed at only one side of the first and second light guide plates 201 and 202, the minute intaglio or embossed patterns 401 may be formed on the upper or lower surface of the first and second light guide plates 201 and 202 so that the more minute intaglio or embossed patterns 401 are far from the other side of the first and second light guide plates 201 and 202, the more minute intaglio or embossed patterns 401 are formed in dense. In case that the first and second light arrays 23 and 24 are formed at opposite sides of the first and second light guide plates 201 and 202, the minute intaglio or embossed patterns 401 may be formed on the upper or lower surface of the first and second light guide plates 201 and 202 so that the more minute intaglio or embossed patterns 401 are near to a central position of the first and second light guide plates 201 and 202, the more minute intaglio or embossed patterns 401 are formed in dense. A first depth H of the first and second intaglio patterns 301 and 302 is larger than a second depth h of the minute intaglio or embossed patterns 401. For example, the ratio of the first depth H to the second depth h is as follows:

h:H=1:2 to 1000

Third Exemplary Embodiment for Light Guide Plate Part and Light Arrays

FIGS. 13A and 13B illustrate a part of the light guide plate part 20 according to a third exemplary embodiment of the invention.

Referring to FIGS. 13A and 13B, the light guide plate part 20 consists of a single light guide plate 20.

The light guide plate 20 is made of a flat plate or a wedge plate containing a transparent resin. The light guide plate 20 includes first intaglio patterns 301 and a second intaglio patterns 302 formed on at least one surface thereof so that they are intersected each other in a horizontal and a vertical directions, respectively. FIG. 13A illustrates one example in which the first and second intaglio patterns 301 and 302 are formed on any one of the upper and lower surface of the light guide plate 20. FIG. 13B illustrates another example in which the first intaglio patterns 301 are formed on lower surface of the light guide plate 20 and the second intaglio patterns 302 are formed on the upper surface of the light guide plate 20. Of course, the first intaglio patterns 301 may be formed on the upper surface of the light guide plate 20 and the second intaglio patterns 302 may be formed on the lower surface of the light guide plate 20.

The first and second intaglio patterns 301 and 302 which are intersected with each other enhance the going-straight property of the light and divide the light guide plate 20 into the blocks B11 to B41 in the matrix type as shown in FIG. 3. That is, the blocks B11 to B41 are divided into the matrix type by the intersection of the first and second intaglio patterns 301 and 302. According to the intersection of the first and second intaglio patterns 301 and 302, a first light guide channels and a second light guide channels perpendicular to the first light guide channels are defined. Each of the first intaglio patterns 301 includes a first elongated groove formed at each interface between the first light guide channels so that the depth of the first elongated groove is smaller than the thickness of the light guide plate 20. The first light guide channels formed in a vertical direction are defined by the first elongated grooves. Each of the second intaglio patterns 302 includes a second elongated groove formed at each interface between the second light guide channels so that the depth of the second elongated groove is smaller than the thickness of the light guide plate 20. The second light guide channels formed in a horizontal direction are defined by the second elongated grooves. The local dimming is implemented by dividing the surface light incident to the liquid crystal display panel 10 to correspond to the blocks B11 to B46. The constructional features and optical functions of the intaglio patterns according to the third embodiment of the invention are substantially the same as that of the first and second intaglio patterns according to the second embodiment.

In FIGS. 13A to 13B, letters ULED231 to ULED233 indicate light incident from the first light array 23 to the first light guide channels and letters LLED241 to LLED243 indicate light incident from the second light array 24 to the second light guide channels.

Each of the first and second light arrays 23 and 24 includes a plurality of point light sources such as light emitting diodes (LEDs). The light sources of the first light array 23 are disposed to face at least one of the upper and lower sides of the light guide plate 20 to emit the light to the first light guide channels. The amount of emitting light of each light source in the first light array 23 is independently controlled by current supplied from the first light array driving part 21. The light sources of the second light array 24 are disposed to face at least one of the left and right sides of the light guide plate 20 to emit the light to the second light guide channels. The amount of emitting light of each light source of the second light array 24 is independently controlled by current supplied from the second light array driving part 22. Each light source of the first light array 23 emits the light depending on current supplied from the first light array driving part 21 and propagates the light to the first light guide channels. The light emitted from the first light array 23 is totally reflected by the first intaglio patterns 301 to be propagated in a high going-straight property along the first light guide channels. Each of the second light array 24 emit light depending on current supplied from the second light array driving part 22 and propagate the light to the second light guide channels. The light emitted from the second light array 24 is totally reflected by the second intaglio patterns 302 to be propagated in a high going-straight property along the second light guide channels.

Figure 14A:
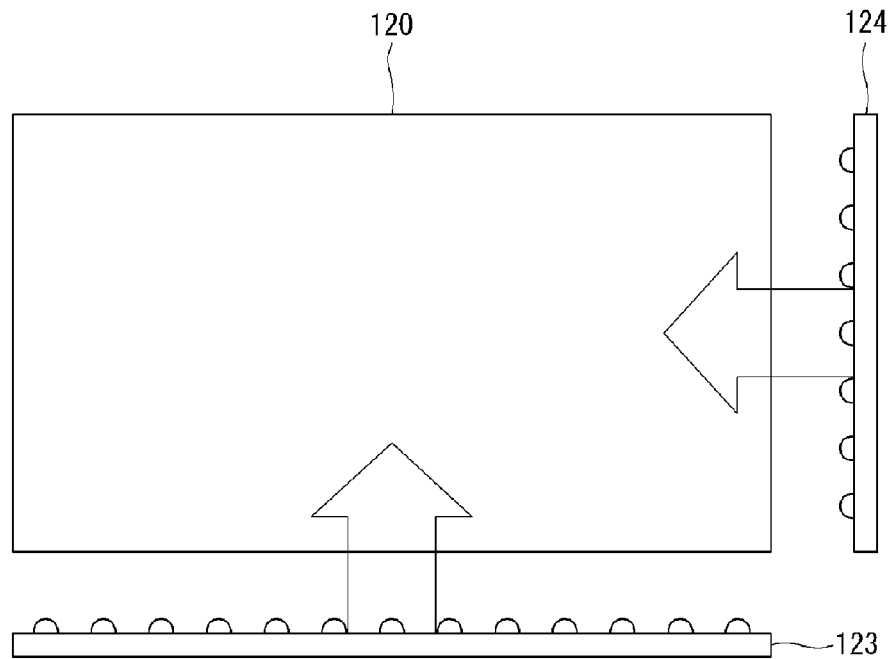
FIGS. 14A and 14B are diagrams which illustrate a part of an edge type backlight unit.
Figure 14B:
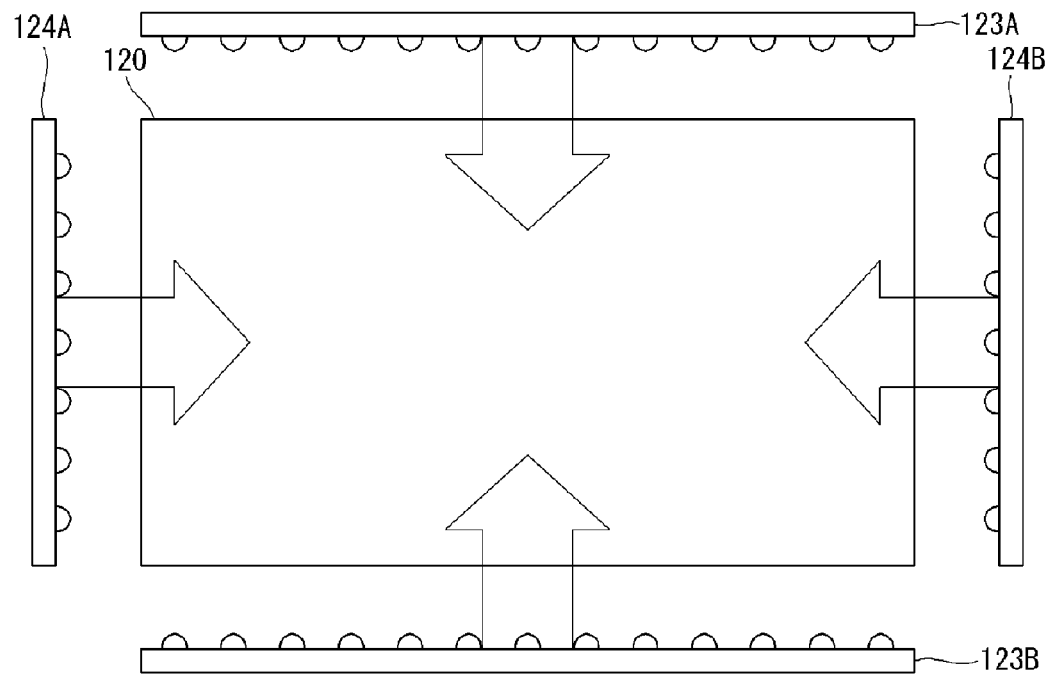

On the other hand, the process of determining and adjusting the dimming values is applicable to the following cases:

i) A construction in which the light guide plate part of the edge type backlight unit includes two light guide plate arrays of which the one is disposed under the other one, each light guide plate array having a plurality of divided light guide plates, and the divided light guide plates of the one light guide plate array being intersected with the divided light guide plates of the other light guide plate array;

ii) Another construction in which the light guide plate part of the edge type backlight unit includes two light guide plates of which the one is disposed under the other one, each light guide plate having a plurality of intaglio patterns formed on at least one surface thereof, and the intaglio patterns of the one light guide plate being intersected with the intaglio patterns of the other light guide plate; and iii) Another construction in which the light guide plate part of the edge type backlight unit includes single light guide plate, the light guide plate having a plurality of intaglio patterns formed on at least one surface thereof to be intersected each other; and iv) A construction of the edge type backlight unit as shown in FIGS. 14A and 14B.

FIG. 14A illustrates a diagram in which a first and a second light arrays 123 and 124 are disposed at a first and a second sides of the light guide plate 120, respectively, and FIG. 14B illustrates a diagram in which a first to a fourth light arrays 123A, 123B, 124A and 124B are disposed at a first to fourth sides of the light guide plate 120, respectively. Although the local dimming effect of the embodiments shown in FIGS. 14A and 14B is lower than that of the above-mentioned cases i) to iii) because of a low going-straight property thereof, it is possible to obtain the local dimming effect and a compensation effect for the distortion of the display picture and the decrease of luminance generated when the local dimming is implemented if the going-straight property of the light sources is very high.

As above-mentioned, the liquid crystal display and the method of driving the same according to embodiments of the invention can implement the local dimming by the edge type backlight unit, thereby enhancing the contrast property and achieving the slimness of the liquid crystal display. It is also possible to effectively compensate the distortion of the display picture and the decrease of luminance generated when the local dimming is implemented.

It will be apparent to those skilled in the art that various modifications and variations can be made to the structure of the invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A liquid crystal display, comprising:
a liquid crystal display panel which displays a picture;
a backlight unit including a light guide plate part in which first light guide channels of a first direction and second light guide channels of a second direction intersected with the first direction are formed, first light array for illuminating light to the first light guide channels, and second light array for illuminating light to the second light guide channels, respectively, where blocks are defined by intersection of a plurality of first line blocks in parallel with one another in the first direction corresponding to the first light guide channels and a plurality of second line blocks in parallel with one another in the second direction corresponding to the second light guide channels; and
a dimming controller for analyzing an input picture to correspond to the blocks to obtain first dimming values for independently controlling luminances of light sources of the first light array, determining second dimming values for independently controlling luminances of light sources of the second light array based on the first dimming values, adjusting the first and second dimming values so that a luminance difference between neighboring blocks caused by the first and second dimming values is decreased, and lowering an entire luminance of a display picture by an amount of luminance increased by the adjustment of the first and second dimming values,
wherein each of the first dimming values is determined based on a first maximum luminance value determined for each of the first light guide channels of the first direction, the first maximum luminance value is determined among final target luminance values of the blocks corresponding to each of the first light guide channels,
wherein each of the second dimming values is determined based on a second maximum luminance value determined for each of the second light guide channels of the second direction, and
wherein the second maximum luminance value is determined among intermediate target luminance values which are difference values between the first maximum luminance value from the final target luminance values.

2. The liquid crystal display of claim 1, wherein:
the light sources of the first light array illuminate light to the first light guide channels in response to the adjusted first dimming value; and
the light sources of the second light array illuminate light to the second light guide channels in response to the adjusted second dimming value.

3. The liquid crystal display of claim 1, wherein:
the dimming controller comprises:
a first lookup table which outputs the first dimming values corresponding to luminance values of light sources of the first light array depending on the first maximum luminance value;
a second lookup table which outputs the second dimming values corresponding to luminance values of light sources of the second light array depending on the second maximum luminance value; and
a third lookup table which outputs a third dimming value to correspond to surrounding luminance values for adjusting the first and second dimming values; and
the surrounding luminance values are set so that a luminance value difference between the first and second dimming values and the surrounding luminance value is a predetermined threshold luminance value or less.

4. The liquid crystal display of claim 1, wherein the light guide plate part comprises:
a first light guide plate array having a plurality of first light guide plates arranged in parallel in the first direction to define the first light guide channels; and
a second light guide plate array disposed under the first light guide plate array and comprising a plurality of second light guide plates arranged in parallel in the second direction intersected with the first direction to define the second light guide channels.

5. The liquid crystal display of claim 1, wherein:
the light guide plate part comprises:
- a first light guide plate on which first intaglio patterns are formed in the first direction to define the first light guide channels; and
- a second light guide plate on which second intaglio patterns are formed in the second direction intersected with the first direction to define the second light guide channels; and the second light guide plate is disposed under the first light guide plate.

6. The liquid crystal display of claim 1, wherein:
the light guide plate part comprises a single light guide plate on which first intaglio patterns are formed in the first direction to define the first light guide channels; and
second intaglio patterns are formed in the second direction intersected with the first direction to define the second light guide channels.

7. A method of driving a liquid crystal display comprising a liquid crystal display panel on which a picture is displayed, the method comprising:
- defining the liquid crystal display panel into blocks having a matrix type to correspond to a light guide plate part in which first light guide channels of a first direction and second light guide channels of a second direction intersected with the first direction are formed, first light sources for illuminating light to at least one ends of the first light guide channels, and second light sources for illuminating light to at least one ends of the second light guide channels of the light guide plate part; and
- analyzing an input picture to correspond to the blocks to obtain first dimming values for independently controlling luminance of the first light sources, obtaining second dimming values for independently controlling luminance of the second light sources based on the first dimming values, adjusting the first and second dimming values so that a luminance difference between neighboring blocks caused by the first and second dimming values is decreased, and lowering an entire luminance of a display picture by an amount of luminance increased by the adjustment of the first and second dimming values,
- wherein the blocks are defined by intersection of a plurality of first line blocks in parallel with one another in the first direction corresponding to the first light guide channels and a plurality of second line blocks in parallel with one another in the second direction corresponding to the second light guide channels,
- wherein each of the first dimming values is determined based on a first maximum luminance value determined for each of the first light guide channels of the first direction,
- wherein the first maximum luminance value is determined among final target luminance values of the blocks corresponding to each of the first light guide channels,
- wherein each of the second dimming values is determined based on a second maximum luminance value determined for each of the second light guide channels of the second direction, and
- wherein the second maximum luminance value is determined among intermediate target luminance values which are difference values between the first maximum luminance value from the final target luminance values.

8. The method of claim 7, wherein:
a first lookup table is used for determining the first dimming values;
a second lookup table is used for determining the second dimming values;
the first lookup table outputs the first dimming values corresponding to luminance values of the first light sources depending on the first maximum luminance value; and
the second lookup table outputs the second dimming values corresponding to luminance values of second light sources depending on the second maximum luminance value.

9. The method of claim 7, wherein:
the step of adjusting the first and second dimming values comprises outputting third dimming values for adjusting the first and second dimming values using a third lookup table;
the third lookup table outputs the third dimming values corresponding to surrounding luminance values for adjusting the first and second dimming values; and
the surrounding luminance values are set such that a luminance value difference between the first and second dimming values and the surrounding luminance value is a predetermined threshold luminance value or less.

* * * * *